US010607504B1

(12) United States Patent
Ramanarayanan et al.

(10) Patent No.: US 10,607,504 B1
(45) Date of Patent: Mar. 31, 2020

(54) COMPUTER-IMPLEMENTED SYSTEMS AND METHODS FOR A CROWD SOURCE-BOOTSTRAPPED SPOKEN DIALOG SYSTEM

(71) Applicant: Educational Testing Service, Princeton, NJ (US)

(72) Inventors: Vikram Ramanarayanan, San Francisco, CA (US); David Suendermann-Oeft, San Francisco, CA (US); Patrick Lange, San Francisco, CA (US); Alexei V. Ivanov, Redwood City, CA (US); Keelan Evanini, Pennington, NJ (US); Yao Qian, San Francisco, CA (US); Zhou Yu, Pittsburgh, PA (US)

(73) Assignee: Educational Testing Service, Princeton, NJ (US)

( * ) Notice: Subject to any disclaimer, the term of this patent is extended or adjusted under 35 U.S.C. 154(b) by 377 days.

(21) Appl. No.: 15/272,903

(22) Filed: Sep. 22, 2016

Related U.S. Application Data

(60) Provisional application No. 62/232,537, filed on Sep. 25, 2015.

(51) Int. Cl.
*G09B 19/04* (2006.01)
*G10L 15/22* (2006.01)
(Continued)

(52) U.S. Cl.
CPC ............ *G09B 19/04* (2013.01); *G10L 15/063* (2013.01); *G10L 15/1815* (2013.01); *G10L 15/22* (2013.01); *G10L 2015/0635* (2013.01)

(58) Field of Classification Search
CPC ........................................................ G09B 19/04
(Continued)

(56) References Cited

U.S. PATENT DOCUMENTS

| 2006/0080101 | A1* | 4/2006 | Chotimongkol | G06F 17/278 704/257 |
| 2006/0149555 | A1* | 7/2006 | Fabbrizio | G10L 15/22 704/275 |

(Continued)

OTHER PUBLICATIONS

Bohus, Dan, Raux, Antoine, Harris, Thomas, Eskenazi, Maxine, Rudnicky, Alexander; Olympus: An Open-Source Framework for Conversational Spoken Language Interface Research; Proceedings of the Workshop on Bridging the Gap: Academic and Industrial Research in Dialog Technolgies; pp. 32-39; 2007.

(Continued)

*Primary Examiner* — Thomas J Hong
(74) *Attorney, Agent, or Firm* — Jones Day

(57) ABSTRACT

Systems and methods are provided for implementing an educational dialog system. An initial task model is accessed that identifies a plurality of dialog states associated with a task, a language model configured to identify a response meaning associated with a received response, and a language understanding model configured to select a next dialog state based on the identified response meaning. The task is provided to a plurality of persons for training. The task model is updated by revising the language model and the language understanding model based on responses received to prompts of the provided task, and the updated task is provided to a student for development of speaking capabilities.

17 Claims, 12 Drawing Sheets

(51) Int. Cl.
  *G10L 15/18* (2013.01)
  *G10L 15/06* (2013.01)
(58) Field of Classification Search
  USPC .......................................................... 434/185
  See application file for complete search history.

(56) References Cited

U.S. PATENT DOCUMENTS

| | | | | |
|---|---|---|---|---|
| 2014/0379326 | A1* | 12/2014 | Sarikaya | G10L 15/18 704/9 |
| 2015/0363393 | A1* | 12/2015 | Williams | G06F 17/289 704/8 |

OTHER PUBLICATIONS

Bohus, Dan, Saw, Chit, Horvitz, Eric; Directions Robot: In-the-Wild Experiences and Lessons Learned; Proceedings of the International Conference on Autonomous Agents and Multi-Agent Systems; pp. 637-644; 2014.

Buchholz, Sabine, Latorre, Javier; Crowdsourcing Preference Tests, and How to Detect Cheating; INTERSPEECH; pp. 3053-3056; Aug. 2011.

Eskenazi, Maxine, Black, Alan, Raux, Antoine, Langner, Brian; Let's Go Lab: a Platform for Evaluation of Spoken Dialog Systems with Real World Users; 9th Annual Conference of the International Speech Communications Association; p. 219; Sep. 2008.

Evanini, Keelan, Higgins, Derrick, Zechner, Klaus; Using Amazon Mechanical Turk for Transcription of Non-Native Speech; Proceedings of the NAACL HLT 2010 Workshop on Creating Speech and Language Data with Amazon's Mechanical Turk; pp. 53-56; Jun. 2010.

Jurcicek, Filip, Keizer, Simon, Gasic, Milica, Mairesse, Francois, Thomson, Blaise, Yu, Kai, Young, Steve; Real User Evaluation of Spoken Dialogue Systems Using Amazon Mechanical Turk; Proceedings of INTERSPEECH; pp. 3061-3064; 2011.

Kousidis, Spyros, Kennington, Casey, Baumann, Timo, Buschmeier, Hendrik, Kopp, Stefan, Schlangen, David; A Multimodal In-Car Dialogue System That Tracks the Driver's Attention; Proceedings of the 16th International Conference on Multimodal Interaction; pp. 26-33; Nov. 2014.

Lamere, Paul, Kwok, Philip, Gouvea, Evandro, Raj, Bhiksha, Singh, Rita, Walker, William, Warmuth, Manfred, Wolf, Peter; The CMU SPHINX-4 Speech Recognition System; Proceedings of the ICASSP; Hong Kong, China; 2003.

McGraw, Ian, Lee, Chia-ying, Hetherington, Lee, Seneff, Stephanie, Glass, James; Collecting Voices from the Cloud; LREC; pp. 1576-1583; 2010.

Minessale, Anthony, Collins, Michael, Schreiber, Darren, Chandler, Raymond; FreeSWITCH Cookbook; Packt Publishing; 2012.

Pappu, Aasish, Rudnicky, Alexander; Deploying Speech Interfaces to the Masses; Proceedings of the Companion Publication of the 2013 International Conference on Intelligent User Interfaces Companion; pp. 41-42; Mar. 2013.

Povey, Daniel, Ghoshal, Arnab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Prylipko, Dmytro, Schnelle-Walka, Dirk, Lord, Spencer, Wendemuth, Andreas; Zanzibar OpenIVR: an Open-Source Framework for Development of Spoken Dialog Systems; Proceedings of the TSD Workshop; 2011.

Ramanarayanan, Vikram, Suendermann-Oeft, David, Ivanov, Alexei, Evanini, Keelan; A Distributed Cloud-Based Dialog System for Conversational Application Development; Proceedings of the SIGDIAL Conference; pp. 432-434; Sep. 2015.

Rayner, Manny, Frank, Ian, Chua, Cathy, Tsourakis, Nikos, Bouillon, Pierrette; For a Fistful of Dollars: Using Crowd-Sourcing to Evaluate a Spoken Language CALL Application; Proceedings of the SLaTE Workshop; Aug. 2011.

Schnelle-Walka, Dirk, Radomski, Stefan, Muhlhauser, Max; JVoiceXML as a Modality Component in the W3C Multimodal Architecture; Journal on Multimodal User Interfaces, 7(3); pp. 183-194; Nov. 2013.

Schroder, Marc, Trouvain, Jurgen; The German Text-to-Speech Synthesis System Mary: a Tool for Research, Development and Teaching; International Journal of Speech Technology, 6(4); pp. 365-377; 2003.

Sciutti, Alessandra, Schilingmann, Lars, Palinko, Oskar, Nagai, Yukie, Sandini, Giulio; A Gaze-Contingent Dictating Robot to Study Turn-Taking; Proceedings of the 10th Annual ACM/IEEE International Conference on Human-Robot Interaction Extended Abstracts; pp. 137-138; 2015.

Suendermann, David, Liscombe, Jackson, Pieraccini, Roberto; How to Drink from a Fire Hose: One Person can Annoscribe 693 Thousand Utterances in One Month; Proceedings of SIGDIAL 2010: the 11th Annual Meeting of the Special Interest Group on Discourse and Dialogue; pp. 257-260; Sep. 2010.

Suendermann, David, Liscombe, Jackson, Pieraccini, Roberto, Evanini, Keelan; How Am I Doing?: A New Framework to Effectively Measure the Performance of Automated Customer Care Contact Centers; Ch. 7 in Advances in Speech Recognition: Mobile Environments, A. Neustein (Ed.); Springer; pp. 155-179; Aug. 2010.

Suendermann-Oeft, David, Ramanarayanan, Vikram, Teckenbrock, Moritz, Neutatz, Felix, Schmidt, Dennis; HALEF: An Open-Source Standard-Compliant Telephony-Based Modular Spoken Dialog System—A Review and an Outlook; Proceedings of the International Workshop on Spoken Dialog Systems; Jan. 2015.

Taylor, Paul, Black, Alan, Caley, Richard; The Architecture of the Festival Speech Synthesis System; Proceedings of the ESCA Workshop on Speech Synthesis; 1998.

Van Meggelen, Jim, Madsen, Leif, Smith, Jared; Asterisk: The Future of Telephony; Sebastopol, CA: O'Reilly Media; 2007.

Vinciarelli, Alessandro, Pantic, Maja, Bourlard, Herve; Social Signal Processing: Survey of an Emerging Domain; Image and Vision Computing Journal, 27(12); pp. 1743-1759; 2009.

Wolters, Maria, Isaac, Karl, Renals, Steve; Evaluating Speech Synthesis Intelligibility Using Amazon Mechanical Turk; pp. 136-141; Jan. 2010.

Yu, Zhou, Bonus, Dan, Horvitz, Eric; Incremental Coordination: Attention-Centric Speech Production in a Physically Situated Conversational Agent; Proceedings of the SIGDIAL 2015 Conference; pp. 402-406; Sep. 2015.

Yu, Zhou, Papangelis, Alexandros, Rudnicky, Alexander; TickTock: A Non-Goal-Oriented Multimodal Dialog System with Engagement Awareness; Proceedings of the Association for the Advancement of Artificial Intelligence Spring Symposium; pp. 108-111; 2015.

* cited by examiner

| ITEM | NO. DIALOG STATES | NO. CALLS | COMPLETION RATE (%) |
|---|---|---|---|
| PRAGMATICS (FOOD OFFER) | 1 | 131 | 61.83 |
| PRAGMATICS (SCHEDULING) | 3 | 166 | 66.87 |
| JOB INTERVIEW | 8 | 192 | 35.42 |
| PIZZA CUSTOMER SERVICE | 7 | 187 | 47.06 |

US 10,607,504 B1

COMPUTER-IMPLEMENTED SYSTEMS AND METHODS FOR A CROWD SOURCE-BOOTSTRAPPED SPOKEN DIALOG SYSTEM

CROSS-REFERENCE TO RELATED APPLICATIONS

This application claims priority to U.S. Provisional Application No. 62/232,537, entitled "Bootstrapping Development of a Cloud-Based Multimodal Dialog System in the Educational Domain," filed Sep. 25, 2015, the entirety of each of which is incorporated herein by reference.

FIELD

The technology described in this patent document relates generally to interaction evaluation and more particularly to development of a spoken dialog system for teaching and evaluation of interactions.

BACKGROUND

Spoken dialog systems (SDSs) consist of multiple subsystems, such as automatic speech recognizers (ASRs), spoken language understanding (SLU) modules, dialog managers (DMs), and spoken language generators, among others, interacting synergistically and often in real time. Each of these subsystems is complex and brings with it design challenges and open research questions in its own right. Rapidly bootstrapping a complete, working dialog system from scratch is therefore a challenge of considerable magnitude. Apart from the issues involved in training reasonably accurate models for ASR and SLU that work well in the domain of operation in real time, one should review that the individual systems also work well in sequence such that the overall SDS performance does not suffer and provides an effective interaction with interlocutors who call into the system.

The ability to rapidly prototype and develop such SDSs is important for applications in the educational domain. For example, in automated conversational assessment, test developers might design several conversational items, each in a slightly different domain or subject area. One can, in such situations, be able to rapidly develop models and capabilities to ensure that the SDS can handle each of these diverse conversational applications gracefully. This is also true in the case of learning applications and so-called formative assessments: One should be able to quickly and accurately bootstrap SDSs that can respond to a wide variety of learner inputs across domains and contexts. Language learning and assessments add yet another complication in that systems need to deal gracefully with non-native speech. Despite these challenges, the increasing demand for non-native conversational learning and assessment applications makes this avenue of research an important one to pursue; however, this requires us to find a way to rapidly obtain data for model building and refinement in an iterative cycle.

SUMMARY

Systems and methods are provided for implementing an educational dialog system. An initial task model is accessed that identifies a plurality of dialog states associated with a task, a language model configured to identify a response meaning associated with a received response, and a language understanding model configured to select a next dialog state based on the identified response meaning. The task is provided to a plurality of persons for training, where providing the task includes providing a prompt for a particular one of the dialog states, receiving a response to the prompt, using the language model to determine the response meaning based on the received response, and selecting a particular next dialog state based on the determined response meaning. The task model is updated by revising the language model and the language understanding model based on responses received to prompts of the provided task, and the updated task is provided to a student for development of speaking capabilities.

As another example, a system for implementing an educational dialog system includes a processing system that includes one or more data processors and a computer-readable medium encoded with instructions for commanding the processing system to execute steps of a method. In the method, an initial task model is accessed that identifies a plurality of dialog states associated with a task, a language model configured to identify a response meaning associated with a received response, and a language understanding model configured to select a next dialog state based on the identified response meaning. The task is provided to a plurality of persons for training, where providing the task includes providing a prompt for a particular one of the dialog states, receiving a response to the prompt, using the language model to determine the response meaning based on the received response, and selecting a particular next dialog state based on the determined response meaning. The task model is updated by revising the language model and the language understanding model based on responses received to prompts of the provided task, and the updated task is provided to a student for development of speaking capabilities.

As a further example, a computer-readable medium is encoded with instructions for commanding a processing system to implement a method associated with an educational dialog system. In the method, an initial task model is accessed that identifies a plurality of dialog states associated with a task, a language model configured to identify a response meaning associated with a received response, and a language understanding model configured to select a next dialog state based on the identified response meaning. The task is provided to a plurality of persons for training, where providing the task includes providing a prompt for a particular one of the dialog states, receiving a response to the prompt, using the language model to determine the response meaning based on the received response, and selecting a particular next dialog state based on the determined response meaning. The task model is updated by revising the language model and the language understanding model based on responses received to prompts of the provided task, and the updated task is provided to a student for development of speaking capabilities.

DETAILED DESCRIPTION

Figure 1:
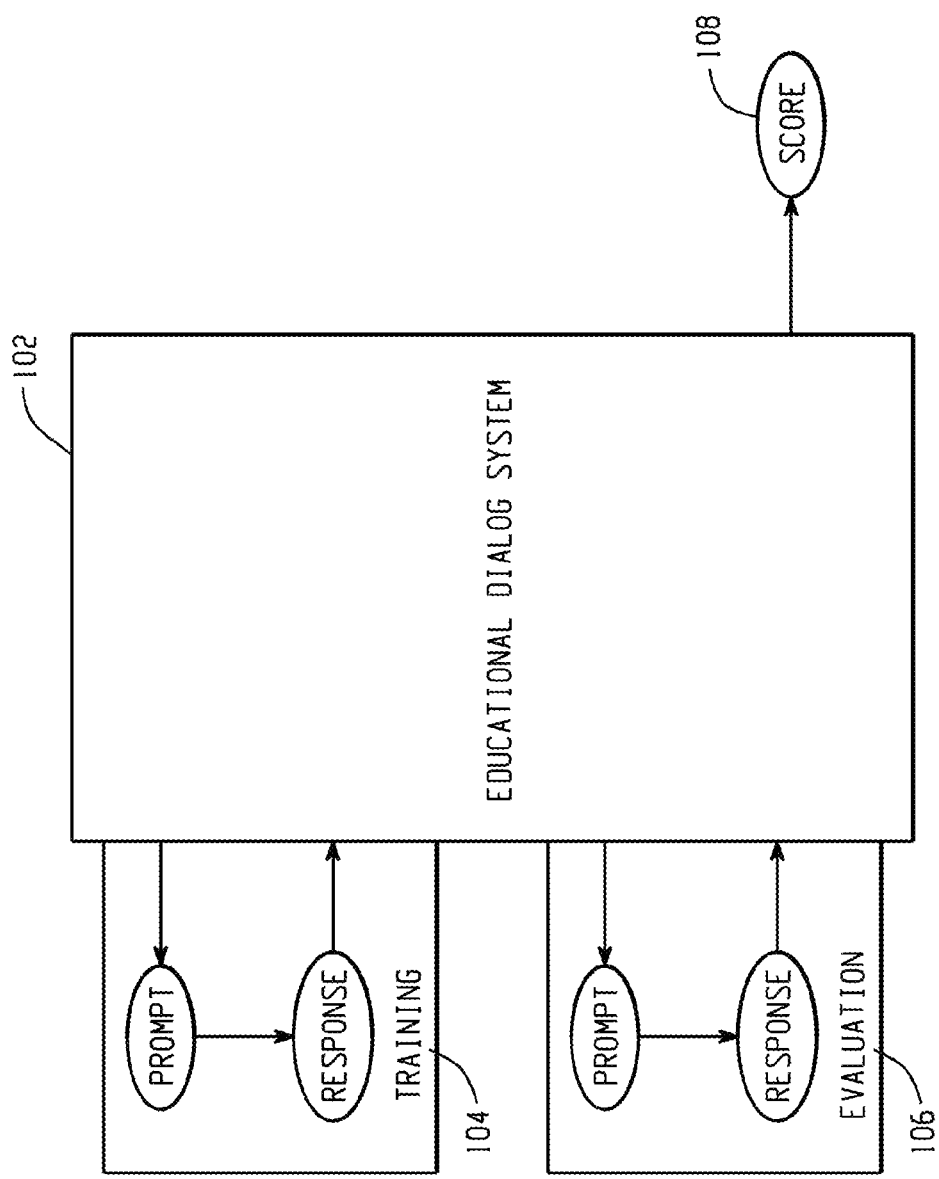
FIG. 1 is a diagram depicting a processor-implemented educational dialog system.

FIG. 1 is a diagram depicting a processor-implemented educational dialog system. The educational dialog system 102 is configured to interactively provide prompts associated with dialog states to an interactor, prompting the interactor to provide a response. In this way, the interactor can participate in a simulated conversation with the dialog system 102. The dialog system 102 may provide its prompts in a voice-only fashion (e.g., via a speaker), or in a multi-modal fashion using an avatar (e.g., via a graphical user interface, a puppet, an artificial life form) that communicates both voice and information via other modalities, such as facial expressions and body movements.

Figure 2:
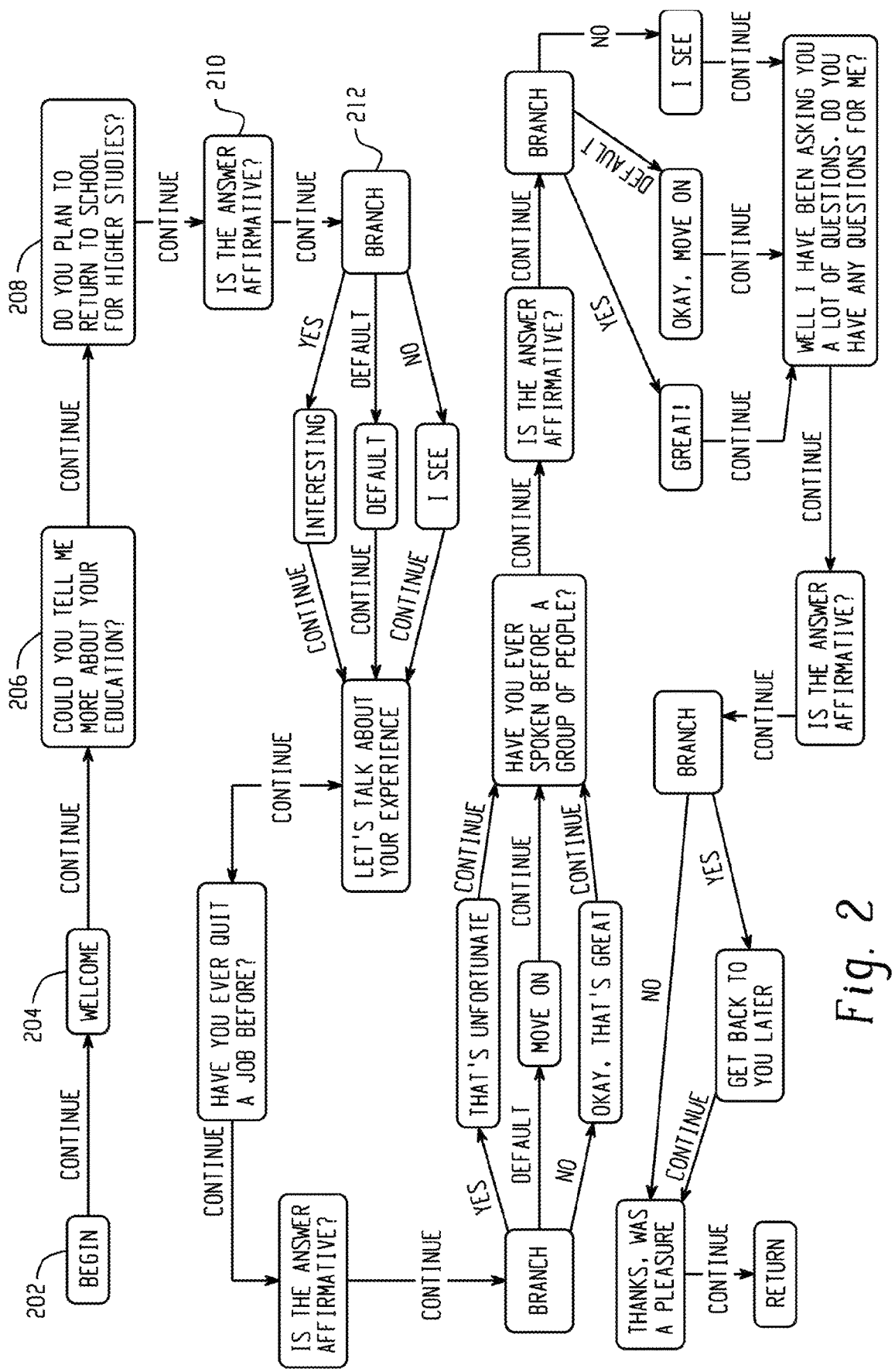
FIG. 2 is a diagram depicting example dialog states associated with a task.

The educational dialog system 102 of FIG. 1 is configured initially with a base task model that identifies the dialog states associated with a conversation task. The dialog states indicate an anticipated path of a task that will be facilitated by the educational dialog system 102. FIG. 2 is a diagram depicting example dialog states associated with a task. The task begins at 202 where the dialog system provides a welcome at 204 and asks initial questions at 206 and 208. The question at 208 is the first time in the dialog states that the conversation branches based on a response given by the interactor, as indicated by the evaluation at 210 and the corresponding branch at 212 to one of three different possible paths. In one embodiment, the evaluation of the interactor response to the prompt question at 208 is performed in two steps. First, the response to the prompt is processed (e.g., voice responses are decoded via automatic speech recognition, facial expressions are determined via video processing, body language is detected via infrared motion capture) to determine a response meaning associated with the response (e.g., based on the totality of data received in the response, such as audio, video, and motion capture) using a language model. Once the meaning is determined at 208-210, that meaning is utilized at 210-212 to select an appropriate branch using a meaning understanding (spoken language) model. While the example of FIG. 2 generally depicts a single path task conversation, more complicated sets of dialog states (e.g., tree shaped) can be implemented. For example, voice, gesture, and facial expression data can be used to measure an engagement level of an interactor (e.g., based on head pose, gaze, and facial expressions to identify smiles or indications of boredom, such as yawns, as well as content of detected speech), where positive feedback or other encouragement is given to an interactor whose engagement is determined to have waned.

With reference back to FIG. 1, the educational dialog system 102 utilizes a task model, which includes the plurality of dialog states associated with a task, the language model for understanding the response meaning associated with a received response, and a language (e.g., spoken language) understanding model configured to select a next dialog state based on the identified response meaning. An initial task model can take the form of a set of dialog states (e.g., as depicted in FIG. 2) and a base/default language model and language understanding model. The educational dialog system 102 functions in two modes, a training mode 104, and an active learning/evaluation mode 106.

In the training mode, a variety of persons interact with the task to further develop the default language and language understanding models. This additional training enables the dialog system 102 to better understand context and nuances associated with the task being developed and implemented. For example, in different tasks, the phrase "I don't know" can have different meanings. In a task where an interactor is under police interrogation, that phrase likely means that the subject has no knowledge of the topic. But, where the task potentially includes flirtatious behavior by an interactor, the phrase "I don't know" combined with a smile and a shrug could imply coy behavior, where the subject really does have knowledge on the topic. The base language model and language understanding model may not be able to understand such nuances, but trained versions of those models, which adjust their behavior based on successful/unsuccessful completions of tasks and indicated survey approvals or disapprovals by training-interactors will gain an understanding of these factors over time.

In one embodiment, the training mode 104 for a task model for a task is crowd sourced (e.g., using the Amazon Mechanical Turk platform). A plurality of training-interactors interact with a task in training mode 104 via prompts and responses, where those responses (e.g., speech, facial expressions, gestures) are captured and evaluated to determine whether the language model and/or language understanding model should be adjusted. Once the task model has been refined via a number of interactions with the public, crowd-sourced participants, the improved task model can be provided for educational purposes, such as for developing speaking and interaction skills of non-native language speakers in a drilling or even an evaluation context, where a score 108 is provided.

Figure 3:
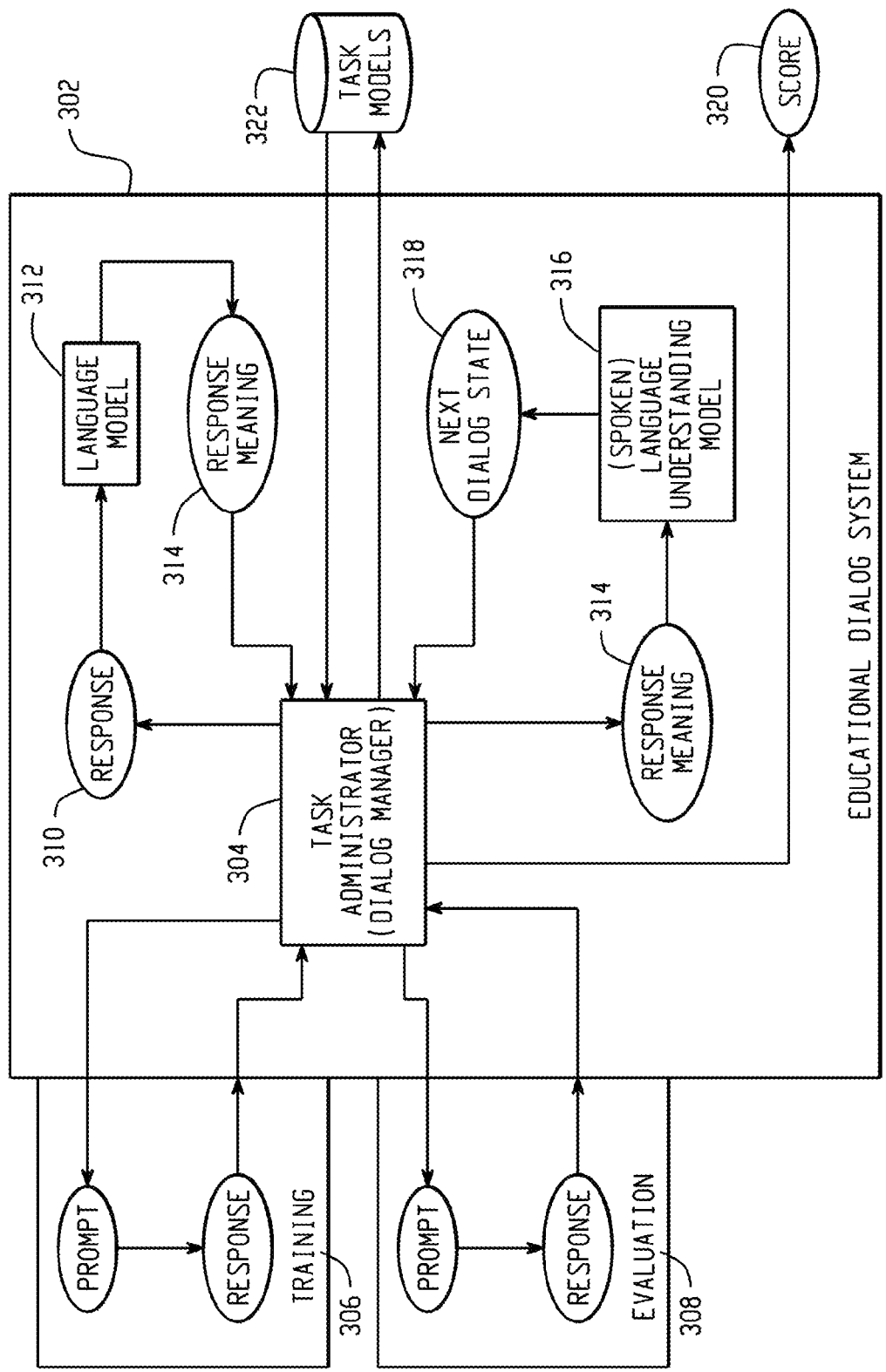
FIG. 3 is a diagram depicting example components of an educational dialog system.

FIG. 3 is a diagram depicting example components of an educational dialog system. The dialog system 302 includes a task administrator (dialog manager) 304. The task administrator 304 monitors traversal of the dialog states of a task conversation. It provides corresponding prompts, whether in training 306 or evaluation 308 mode and receives corresponding responses. Responses 310 (e.g., text from automatic speech recognition performed on a response) are provided to the language model 312 which determines a response meaning 314 that is returned to the task administrator 304 (or directly to the language understanding model 316). The response meaning 314 is received by the language understanding model 316 and determines the next dialog state 318 that should be taken in the task, where that next state 318 is returned to the task administrator 304.

In a training mode 306, the task administrator 304 is configured to adjust the language model 312 and language understanding model 316 to improve their performance in subsequent interactor iterations. The task model, which includes the dialog states, the current language model, and the current language understanding model, is accessed from a task model data store 322 before each training iteration and is returned, when any of those entities are altered, for storage. In an evaluation mode 308, the task administrator 304 may be configured to output a score 320 indicating a quality of responses received from the evaluation-interactor.

Figure 4:
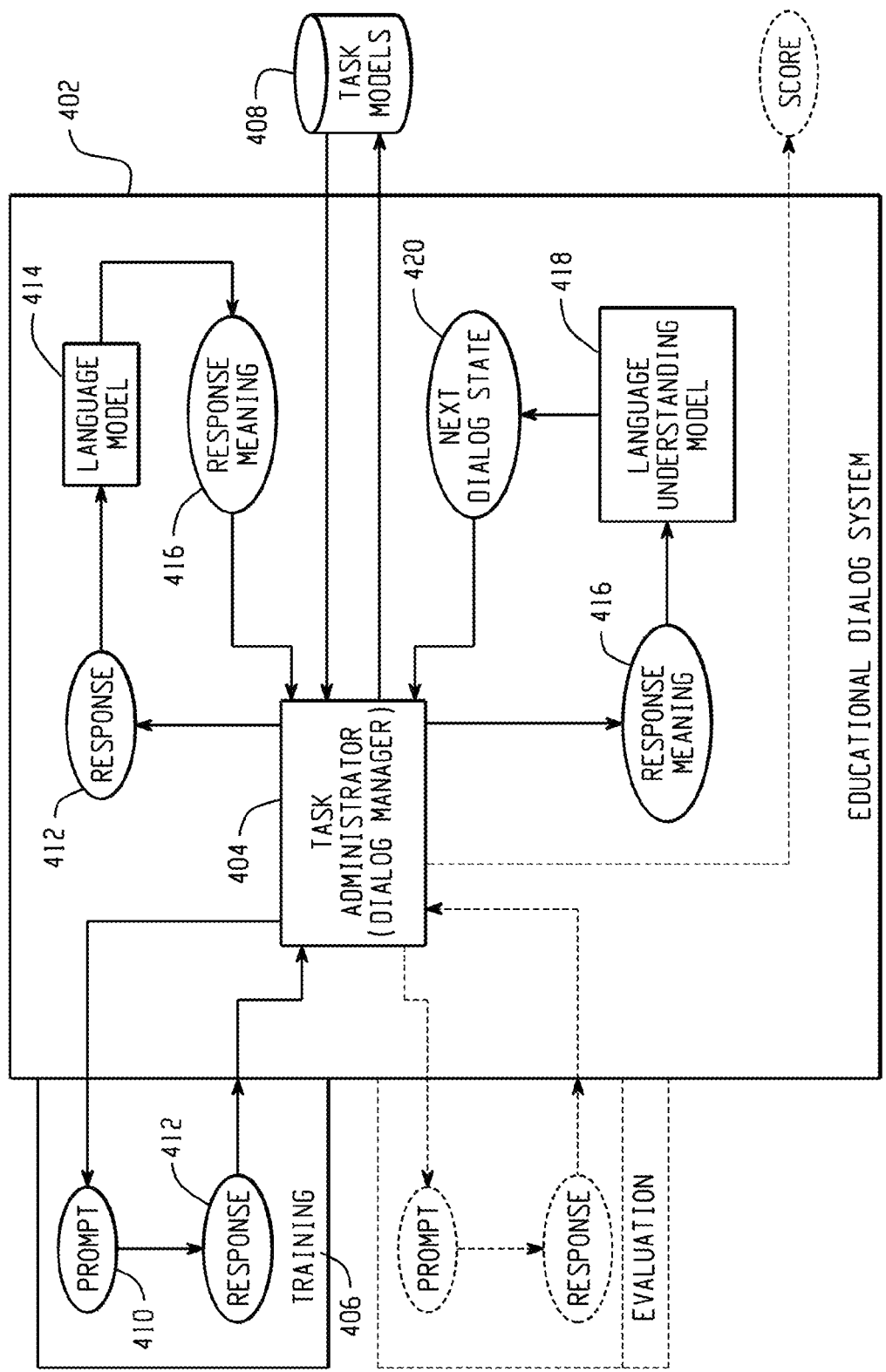
FIG. 4 is a diagram depicting active entities of an educational dialog system in a training mode.

FIG. 4 is a diagram depicting active entities of an educational dialog system in a training mode. In training mode 406, the task administrator 404 accesses the task model for the task to be administered from the task model database 408. The task administrator 404 traverses the dialog states associated with the task model, providing prompts 410 and receiving response 412 from the training-interactor. The responses 412 are provided to the language model 414 which determines response meanings 416, where that response meaning 416 is used by the language understanding model 418 to determine the next dialog state 420 for the task.

Following conclusion of the task (via a completion of the entirety of the task or a failure to complete the task), the task administrator 404 adjusts the language model 414 and the language understanding model 418 based on the training interactions. For example, if a task is not completed or if an interactor states via a survey that they were dissatisfied with the task (e.g., the task did not provide a next prompt that was appropriate for their current response), then the task administrator 404 determines that one of the models 414, 418 should be adjusted to better function. For example, the language model 414 may be refined to apply a different response meaning 416 to a particular response 412 from the training-interactor that resulted in an erroneous dialog state path. If the training-interactor completes the task or indicates a positive experience, then that data is utilized to strengthen the models 414, 418 (e.g., weights associated with potential paths or factors in a neural network model) based on the confirmation that those models 414, 418 behaved appropriately to the responses 412 received from the training-interactor. The adjusted task model is then returned by the task administrator 404 to the task model data store 408.

Figure 5:
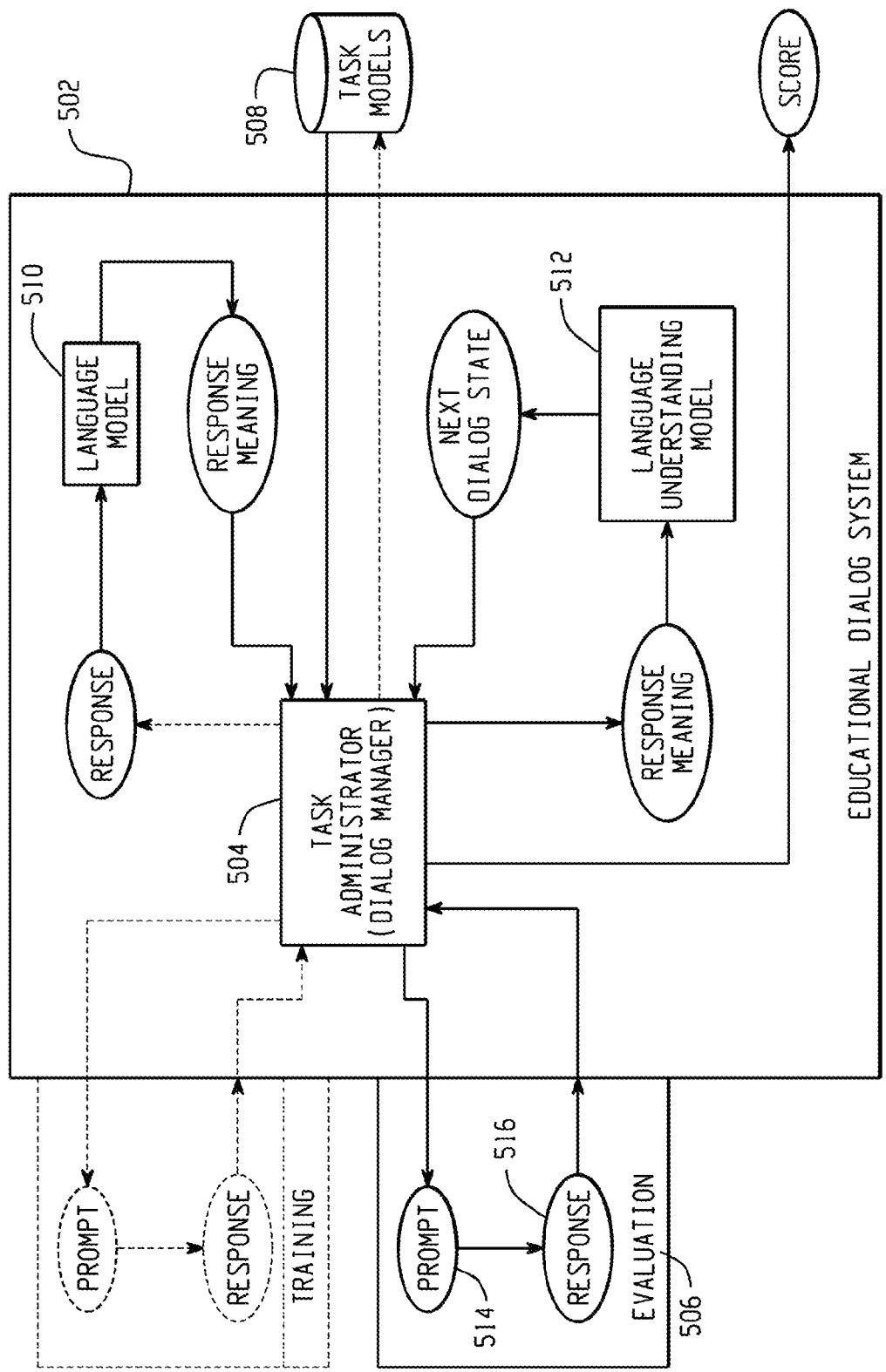
FIG. 5 is a diagram depicting active entities of an educational dialog system in an educational or evaluation mode.

FIG. 5 is a diagram depicting active entities of an educational dialog system in an educational or evaluation mode. In the evaluation mode 506, the task administrator 504 accesses a task model from the task model data store 508 and uses that data to set up the language model 510 and language understanding model 512. The task administrator 504 traverses the dialog states of the task as informed by responses 516 to prompts 514 with the aid of the language model 510 and the language understanding model 512. The task administrator 504 tracks the appropriateness of responses 516 received from the evaluation-interactor as well as other metrics associated with those responses (e.g., pronunciation, grammar) to determine a score 518 indicative of the quality of the interactor's communication with the educational dialog system 502.

Figure 6:
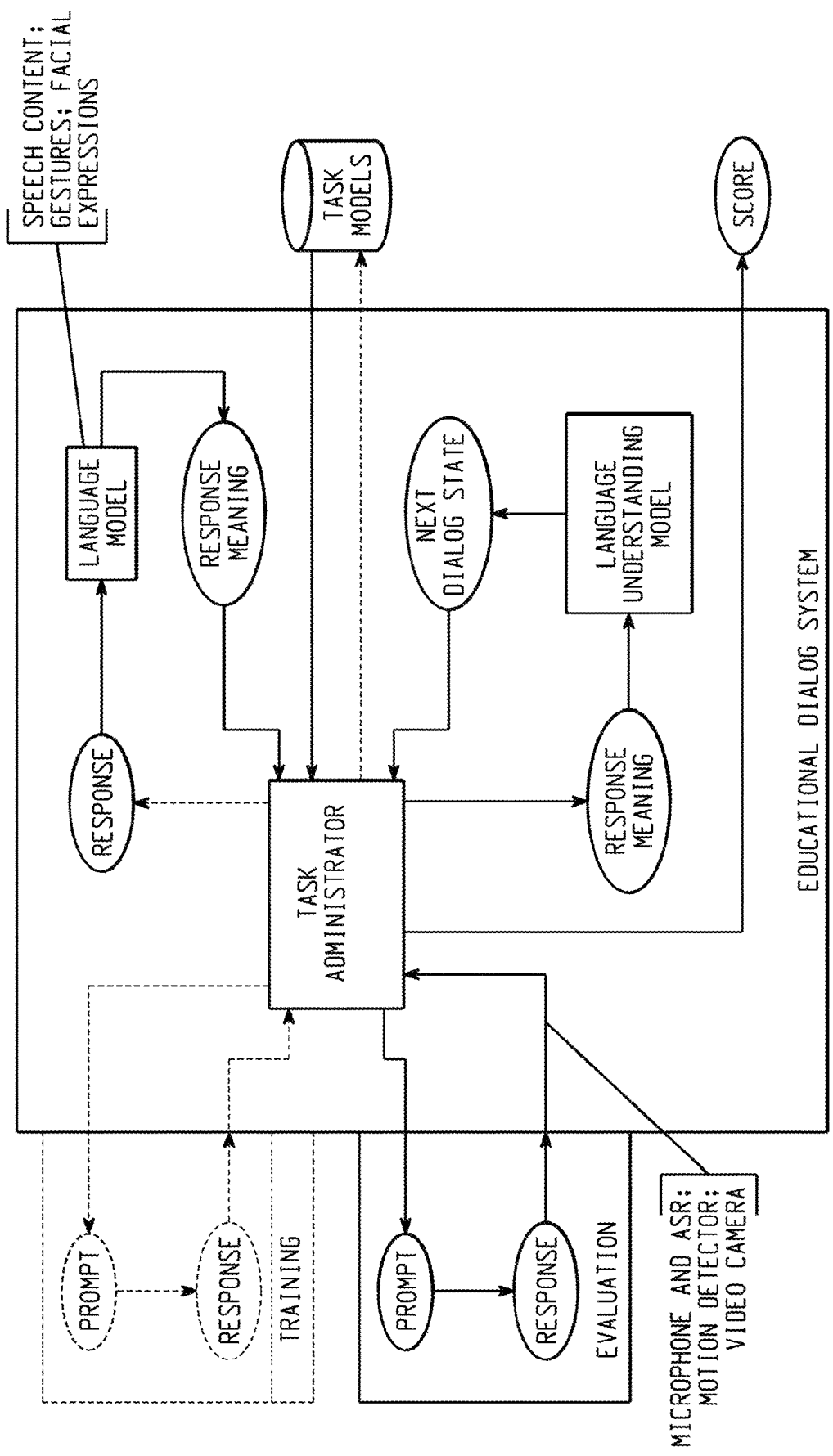
FIG. 6 is a diagram depicting a multi-modal educational dialog system.

FIG. 6 is a diagram depicting a multi-modal educational dialog system. FIG. 6 indicates that speech response data is captured via automatic speech recognition, as well as gesture data via motion detection (e.g., using an XBOX Kinect motion capture device) and facial expression data via video capture and analysis. The language model uses all or a portion of that data to extract meaning associated with responses, where extracted text associated with speech may be assigned different meanings depending on the context of gesture and facial expression data that is identified.

Figure 7:
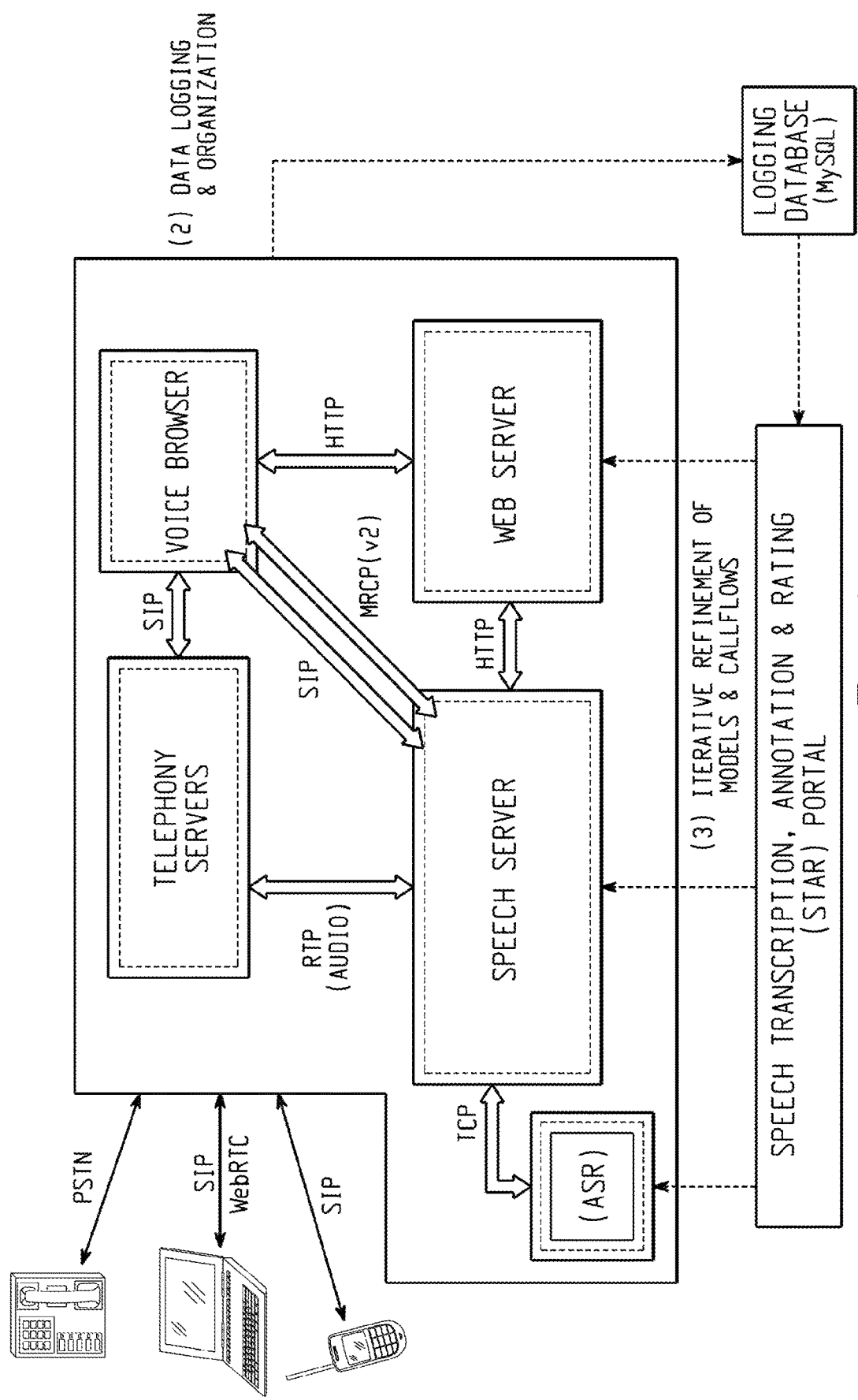
FIGS. 7-8 are diagrams depicting example components of an educational dialog system.
Figure 8:
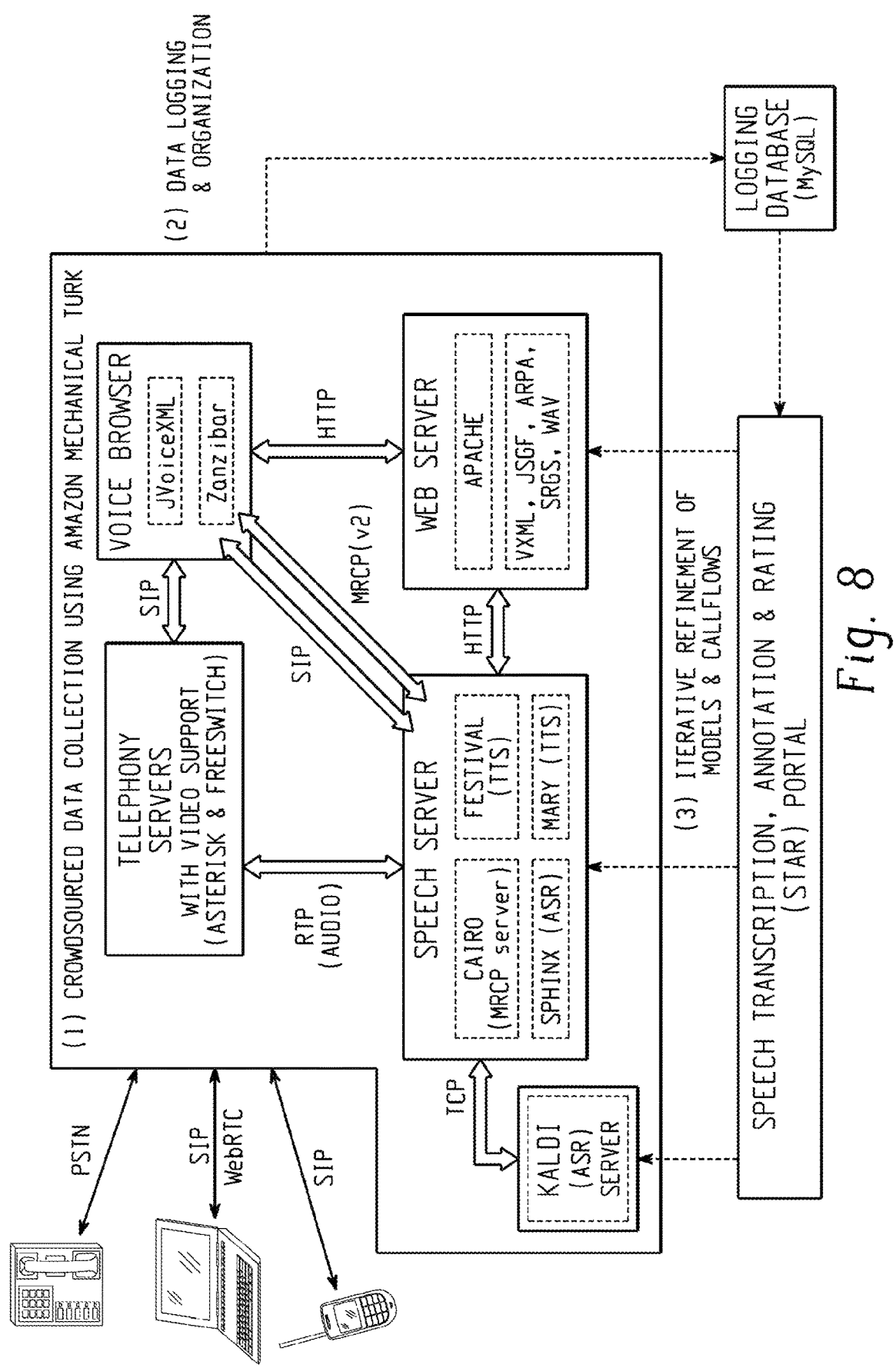

FIGS. 7-8 are diagrams depicting example components of an educational dialog system. Certain embodiments use a HALEF dialog system to develop conversational applications within the crowd sourcing framework. These systems can include one or more of the following components:

Telephony servers (e.g., Asterisk and FreeSWITCH), which are compatible with Session Initiation Protocol (SIP), Public Switched Telephone Network (PSTN), and web Real-Time Communications (WebRTC) standards and include support for voice and video;

A voice browser (e.g., JVoiceXML), which is compatible with VoiceXML 2.1 and can process SIP traffic and which incorporates support for multiple grammar standards, such as Java Speech Grammar Format (JSGF), Advanced Research Projects Agency (ARPA), and Weighted Finite State Transducer (WFST);

A Media Resource Control Protocol (MRCP) speech server, which allows the voice browser to initiate SIP or Real-Time Transport Protocol (RTP) connections from/to the telephony server and incorporates two speech recognizers and synthesizers;

An Apache Tomcat-based web server which can host dynamic VoiceXML pages, web services, and media libraries containing grammars and audio files;

OpenVXML, a VoiceXML-based voice application authoring suite: generates dynamic web applications that can be housed on the web server;

A MySQL database server for storing call logs;

A speech transcription, annotation, and rating portal that allows one to listen to and transcribe full-call recordings, rate them on a variety of dimensions such as caller experience and latency, and perform various semantic annotation tasks to train ASR and SLU modules.

Figure 9:
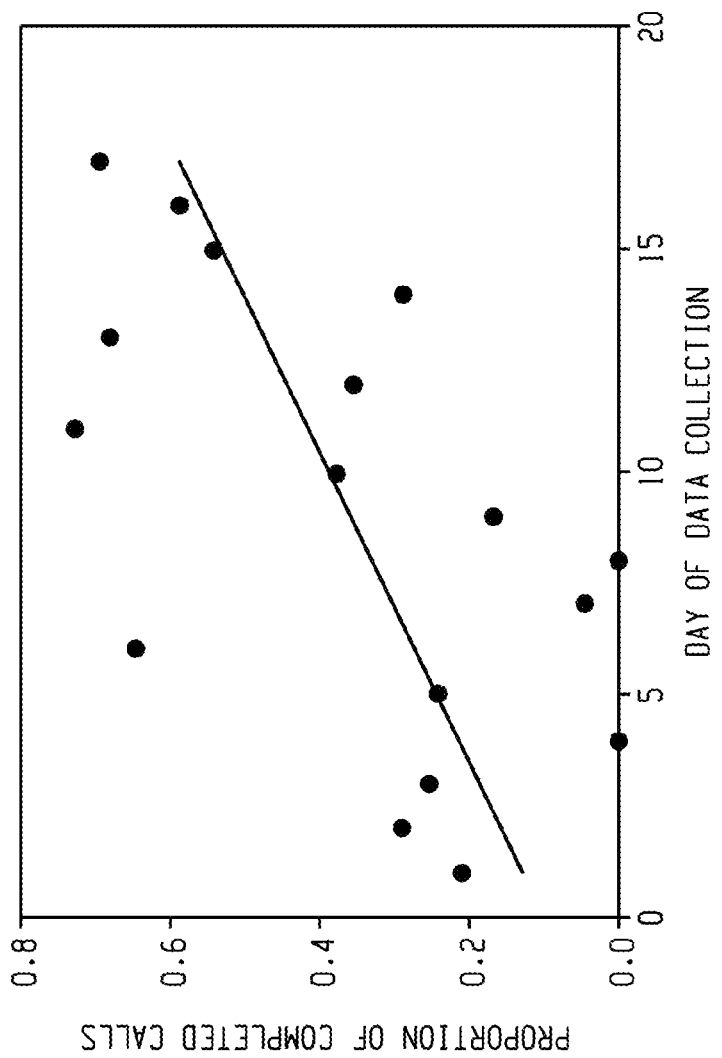
FIG. 9 is a diagram depicting four example tasks and improved performance of task models as those task models are trained (e.g., using the crowd sourcing techniques described herein.

FIG. 9 is a diagram depicting four example tasks and improved performance of task models as those task models are trained (e.g., using the crowd sourcing techniques described herein). In the example of FIG. 9, four tasks are described, having between 1 and 8 dialog states. The final two examples are longer, having 8 and 7 dialog states, respectively. Task models were trained over the number of iterations shown in the middle column, where completion rate is illustrated in a final column as an indicator of quality of the task models. The graph at the bottom of FIG. 9 shows an improvement of completion rate associated with the job interview and pizza customer service tasks over time, as the associated language and language understanding modules were trained using crowd source participation.

Figure 10:
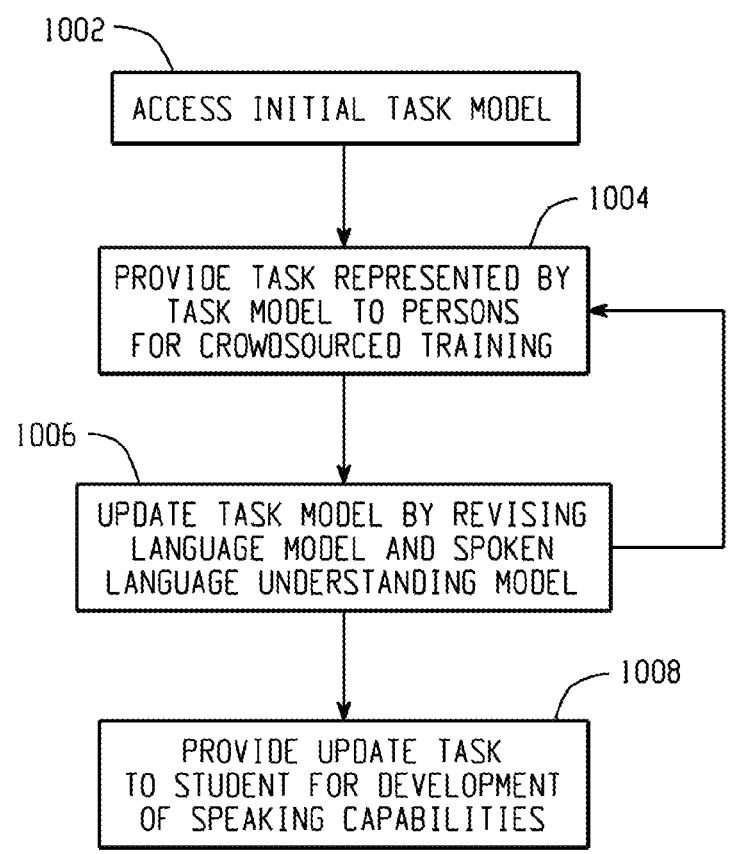
FIG. 10 is a flow diagram depicting a processor-implemented method for implementing an educational dialog system.

FIG. 10 is a flow diagram depicting a processor-implemented method for implementing an educational dialog system. At 1002, an initial task model is accessed that identifies a plurality of dialog states associated with a task, a language model configured to identify a response meaning associated with a received response, and a language understanding model configured to select a next dialog state based on the identified response meaning. The task is provided to a plurality of persons for training at 1004, where providing the task includes providing a prompt for a particular one of the dialog states, receiving a response to the prompt, using the language model to determine the response meaning based on the received response, and selecting a particular next dialog state based on the determined response meaning. The task model is updated at 1006 by revising the language model and the language understanding model based on responses received to prompts of the provided task, and the updated task is provided to a student at 1008 for development of speaking capabilities.

Figure 11A:
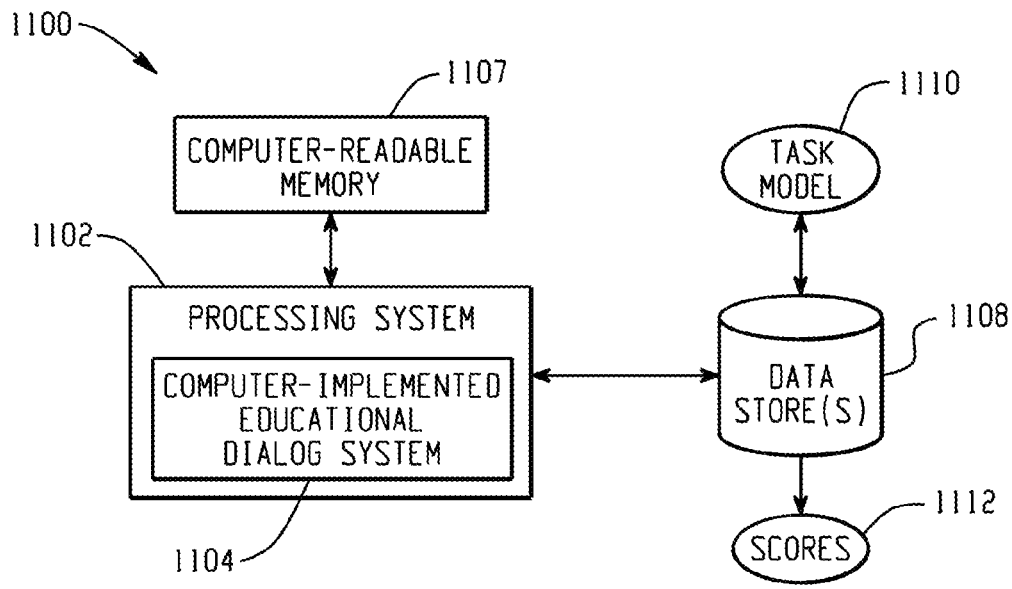
FIGS. 11A, 11B, and 11C depict example systems for implementing the approaches described herein for implementing a computer-implemented educational dialog system.
Figure 11B:
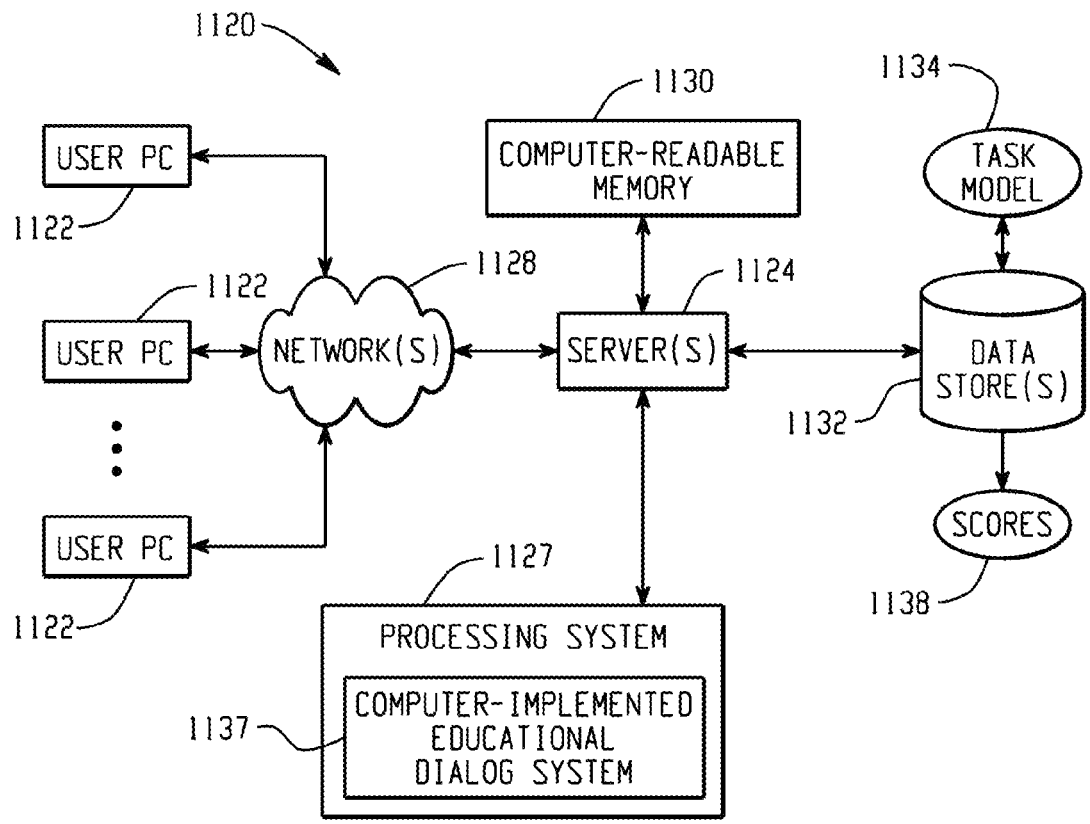
Figure 11C:
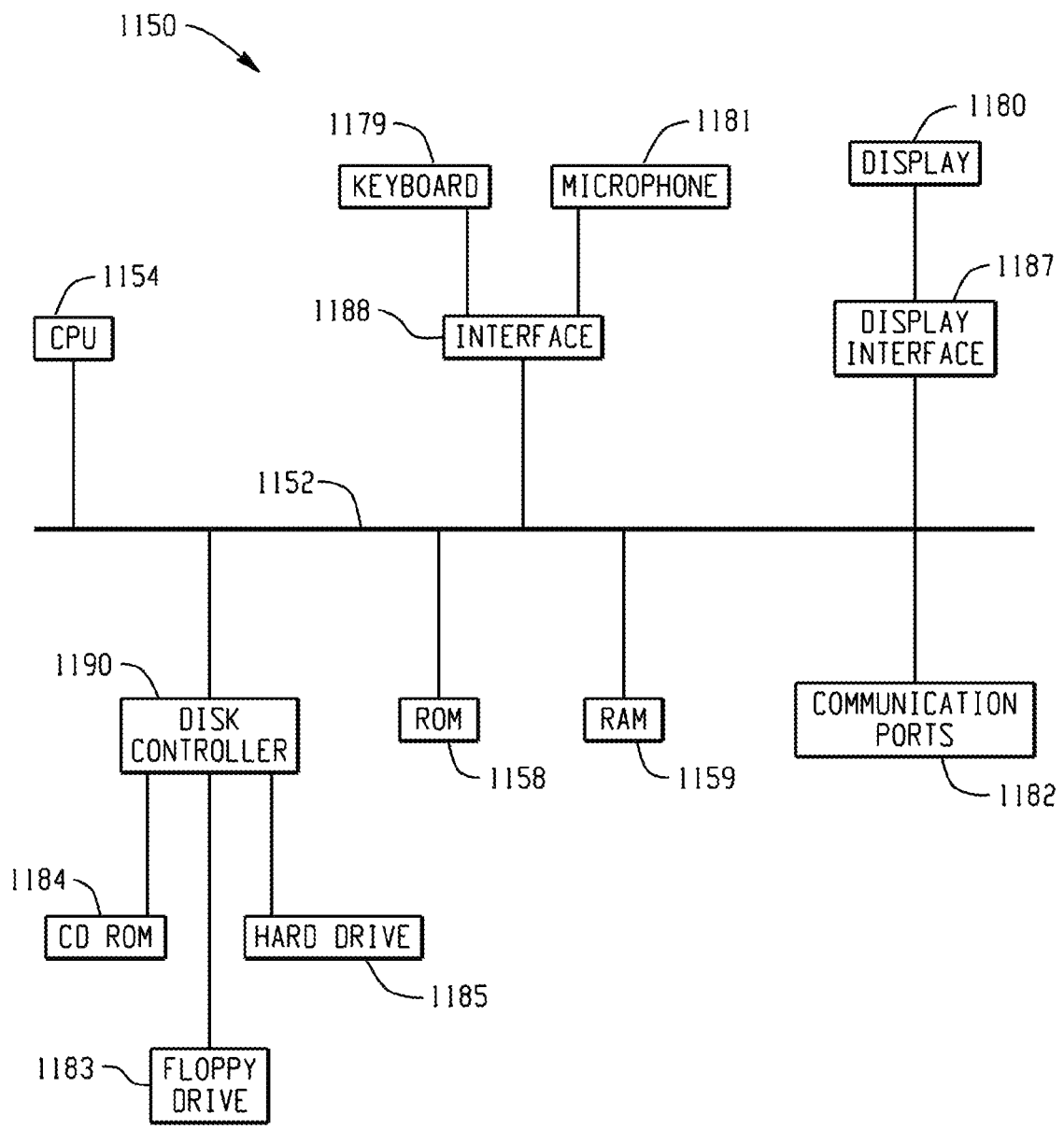

FIGS. 11A, 11B, and 11C depict example systems for implementing the approaches described herein for implementing a computer-implemented educational dialog system. For example, FIG. 11A depicts an exemplary system 1100 that includes a standalone computer architecture where a processing system 1102 (e.g., one or more computer processors located in a given computer or in multiple computers that may be separate and distinct from one another) includes a computer-implemented educational dialog system 1104 being executed on the processing system 1102. The processing system 1102 has access to a computer-readable memory 1107 in addition to one or more data stores 1108. The one or more data stores 1108 may include task models 1110 as well as scores 1112. The processing system 1102 may be a distributed parallel computing environment, which may be used to handle very large-scale data sets.

FIG. 11B depicts a system 1120 that includes a client-server architecture. One or more user PCs 1122 access one or more servers 1124 running a computer-implemented educational dialog system 1137 on a processing system 1127 via one or more networks 1128. The one or more servers 1124 may access a computer-readable memory 1130 as well as one or more data stores 1132. The one or more data stores 1132 may include task models 1134 as well as scores 1138.

FIG. 11C shows a block diagram of exemplary hardware for a standalone computer architecture 1150, such as the architecture depicted in FIG. 11A that may be used to include and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors at a given computer or at multiple computers), may perform calculations and logic operations required to execute a program. A non-transitory processor-readable storage medium, such as read only memory (ROM) 1158 and random access memory (RAM) 1159, may be in communication with the processing system 1154 and may include one or more programming instructions for performing the method of implementing a computer-implemented educational dialog system. Optionally, program instructions may be stored on a non-transitory computer-readable storage medium such as a magnetic disk, optical disk, recordable memory device, flash memory, or other physical storage medium.

In FIGS. 11A, 11B, and 11C, computer readable memories 1108, 1130, 1158, 1159 or data stores 1108, 1132, 1183, 1184, 1188 may include one or more data structures for storing and associating various data used in the example systems for implementing a computer-implemented educational dialog system. For example, a data structure stored in any of the aforementioned locations may be used to store data from XML files, initial parameters, and/or data for other variables described herein. A disk controller 1190 interfaces one or more optional disk drives to the system bus 1152. These disk drives may be external or internal floppy disk drives such as 1183, external or internal CD-ROM, CD-R, CD-RW or DVD drives such as 1184, or external or internal hard drives 1185. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1190, the ROM 1158 and/or the RAM 1159. The processor 1154 may access one or more components as required.

A display interface 1187 may permit information from the bus 1152 to be displayed on a display 1180 in audio, graphic, or alphanumeric format. Communication with external devices may optionally occur using various communication ports 1182.

In addition to these computer-type components, the hardware may also include data input devices, such as a keyboard 1179, or other input device 1181, such as a microphone, remote control, pointer, mouse and/or joystick.

Additionally, the methods and systems described herein may be implemented on many different types of processing devices by program code comprising programming instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents. For example, in one embodiment, in addition to or in the alternative to adjusting language models and language understanding models, systems and methods can be configured to adjust acoustic models (models that relate how probable a given sequence of words correspond to the actual speech signal received), dialog management models (models that inform what the optimal next action of the dialog system should be based on the given state), and engagement prediction models (models that inform the dialog manager how to react given a current engagement state of the user).

The invention claimed is:

1. A processor-implemented method for implementing an educational dialog system, comprising:
   accessing an initial task model that identifies a plurality of dialog states associated with a task, a language model configured to identify a response meaning associated with a received response, and a language understanding model configured to select a next dialog state based on the identified response meaning;

wherein the language model identifies the response meaning based on content of speech of the response received from a person, wherein the content of the speech is determined using automatic speech recognition;

wherein the language model further identifies the response meaning based on gestures associated with the response received from the person, wherein the gestures are captured via a video capture device or an infrared capture device;

providing the task to a plurality of persons for training, wherein providing the task includes providing a prompt for a particular one of the dialog states, receiving a response to the prompt, using the language model to determine the response meaning based on the received response, and selecting a particular next dialog state based on the determined response meaning;

providing a survey to each of the plurality of persons after interaction with the provided task, wherein the survey requests evaluation data regarding the quality of the interaction;

updating the task model by revising the language model and the language understanding model based on responses received to prompts of the provided task and the evaluation data from the surveys;

providing an updated task to a student for development of speaking capabilities; and scoring the student's speaking capabilities based on the student's interaction with the updated task.

2. The method of claim 1, wherein the updated task is provided to the student by an educational organization;

wherein said providing the task to a plurality of persons for training includes providing the task to a pool of public persons unaffiliated with the educational organization.

3. The method of claim 1, further comprising:

providing revised tasks to further persons for additional training prior to providing the updated task to the student.

4. The method of claim 3, further comprising:

tracking whether a first person participating in a round of training completes all of the dialog states associated with the task as a first metric;

tracking whether a second person participating in a round of training completes all of the dialog states associated with the updated task as a second metric;

comparing the first metric and the second metric to determine whether the task model is improving based on additional training.

5. The method of claim 4, wherein updates to the task model are retained when the task model is determined to have improved, wherein updates are reverted when the task model is determined not to have improved.

6. The method of claim 1, wherein the updated task is provided to a student for development of non-native speaking capabilities.

7. A processor-implemented system for implementing an educational dialog system, comprising:

a processing system comprising one or more data processors;

a non-transitory computer-readable medium encoded with instructions for commanding the processing system to execute steps of a method that include:

accessing an initial task model that identifies a plurality of dialog states associated with a task, a language model configured to identify a response meaning associated with a received response, and a language understanding model configured to select a next dialog state based on the identified response meaning;

wherein the language model identifies the response meaning based on content of speech of the response received from a person, wherein the content of the speech is determined using automatic speech recognition;

wherein the language model further identifies the response meaning based on gestures associated with the response received from the person, wherein the gestures are captured via a video capture device or an infrared capture device;

providing the task to a plurality of persons for training, wherein providing the task includes providing a prompt for a particular one of the dialog states, receiving a response to the prompt, using the language model to determine the response meaning based on the received response, and selecting a particular next dialog state based on the determined response meaning;

providing a survey to each of the plurality of persons after interaction with the provided task, wherein the survey requests evaluation data regarding the quality of the interaction;

updating the task model by revising the language model and the language understanding model based on responses received to prompts of the provided task and the evaluation data from the surveys;

providing an updated task to a student for development of speaking capability; and scoring the student's speaking capability based on the student's interaction with the updated task.

8. The system of claim 7, wherein the updated task is provided to the student by an educational organization;

wherein said providing the task to a plurality of persons for training includes providing the task to a pool of public persons unaffiliated with the educational organization.

9. The system of claim 7, wherein the steps further include:

providing revised tasks to further persons for additional training prior to providing the updated task to the student.

10. The system of claim 9, wherein the steps further include:

tracking whether a first person participating in a round of training completes all of the dialog states associated with the task as a first metric;

tracking whether a second person participating in a round of training completes all of the dialog states associated with the updated task as a second metric;

comparing the first metric and the second metric to determine whether the task model is improving based on additional training.

11. The system of claim 10, wherein updates to the task model are retained when the task model is determined to have improved, wherein updates are reverted when the task model is determined not to have improved.

12. The system of claim 10, wherein the updated task is provided to a student for development of non-native speaking capabilities.

13. A non-transitory computer-readable medium encoded with instructions for commanding one or more data processors to execute steps of a method for implementing an educational dialog system, the method comprising:

accessing an initial task model that identifies a plurality of dialog states associated with a task, a language model configured to identify a response meaning associated with a received response, and a language understanding model configured to select a next dialog state based on the identified response meaning;

wherein the language model identifies the response meaning based on content of speech of the response received from a person, wherein the content of the speech is determined using automatic speech recognition;

wherein the language model further identifies the response meaning based on gestures associated with the response received from the person, wherein the gestures are captured via a video capture device or an infrared capture device;

providing the task to a plurality of persons for training, wherein providing the task includes providing a prompt for a particular one of the dialog states, receiving a response to the prompt, using the language model to determine the response meaning based on the received response, and selecting a particular next dialog state based on the determined response meaning;

providing a survey to each of the plurality of persons after interaction with the provided task, wherein the survey requests evaluation data regarding the quality of the interaction;

updating the task model by revising the language model and the language understanding model based on responses received to prompts of the provided task and the evaluation data from the surveys;

providing an updated task to a student for development of speaking capabilities; and scoring the student's speaking capabilities based on the student's interaction with the updated task.

14. The method of claim 1, wherein the gestures captured include facial expressions.

15. The method of claim 1, wherein the language model further identifies the response meaning based on a detected engagement level of the person.

16. The system of claim 7, wherein the gestures captured include facial expressions.

17. The system of claim 7, wherein the language model further identifies the response meaning based on a detected engagement level of the person.

* * * * *